United States Patent
Williams et al.

(10) Patent No.: US 7,153,460 B2
(45) Date of Patent: Dec. 26, 2006

(54) SYSTEM AND METHOD FOR PROVIDING A RENEWABLE MASKING SURFACE

(75) Inventors: Nelson E. Williams, Saline, MI (US); David M. Nagi, Saline, MI (US); Jerome J. Sroka, St. Clair Shores, MI (US)

(73) Assignee: Lear Corporation, Southfield, MI (US)

( * ) Notice: Subject to any disclaimer, the term of this patent is extended or adjusted under 35 U.S.C. 154(b) by 381 days.

(21) Appl. No.: 10/744,153

(22) Filed: Dec. 22, 2003

(65) Prior Publication Data

US 2005/0133957 A1 Jun. 23, 2005

(51) Int. Cl.
*B29C 41/22* (2006.01)

(52) U.S. Cl. ...................... 264/245; 264/250; 264/255; 264/309

(58) Field of Classification Search ...................... None
See application file for complete search history.

(56) References Cited

U.S. PATENT DOCUMENTS

| | | |
|---|---|---|
| 4,562,025 A | 12/1985 | Gray |
| 4,692,293 A | 9/1987 | Gray |
| 4,780,345 A | 10/1988 | Gray |
| 4,836,137 A | 6/1989 | Heine et al. |
| 4,880,588 A | 11/1989 | Brault et al. |
| 5,046,941 A | 9/1991 | Batchelder et al. |
| 5,093,066 A | 3/1992 | Batchelder et al. |
| 5,225,214 A * | 7/1993 | Filion ........................ 425/434 |
| 5,304,273 A | 4/1994 | Kenrick et al. |
| 5,316,715 A | 5/1994 | Gray |
| 6,071,619 A * | 6/2000 | De Winter ............... 428/423.1 |

FOREIGN PATENT DOCUMENTS

| | | | |
|---|---|---|---|
| GB | 1 540 925 | | 2/1979 |
| GB | 1540925 | * | 2/1979 |
| JP | 11010654 | | 1/1999 |

* cited by examiner

*Primary Examiner*—Edmund H. Lee
(74) *Attorney, Agent, or Firm*—Brooks Kushman P.C.

(57) ABSTRACT

A masking system is provided that includes a supply roll of masking material, supported by a first roll support. The supply roll is rotatable on the first roll support, which allows the masking material to be dispensed. A take-up roll is provided to receive masking material after it has been used. A masking arm is positioned on an inside surface of the masking material, and contacts a portion of a mold to capture the masking material between the masking arm and the mold, thereby sealing off a portion of the mold during a coating process. After the coating process, the take-up roll is rotated, thereby dispensing new masking material from the supply roll.

10 Claims, 3 Drawing Sheets

SYSTEM AND METHOD FOR PROVIDING A RENEWABLE MASKING SURFACE

BACKGROUND OF THE INVENTION

1. Field of the Invention

The present invention relates to a system and method for providing a renewable masking surface.

2. Background Art

Aromatic spray polyurethane in-mold coating (IMC) has recently emerged as a cost effective method of producing a variety of different polymeric components. In some cases, spray polyurethane IMC has been able to replace reaction injection molding (RIM) in the production of rugged structural components. The spray polyurethane IMC process takes advantage of cross-link bonding between a coating, usually of a color desired for the finished component, and a polyurethane substrate. The part produced by the spray polyurethane IMC process can then be used in the manufacture of a component, such as an instrument panel for a vehicle, that does not need to be post painted. Indeed, the coating used in the spray polyurethane IMC process can be specifically chosen to match the vehicle interior.

In addition to facilitating production of monochrome parts, the spray polyurethane IMC process can also be used to produce parts having two or more colors. Of course, this adds complexity to the process. One method of producing a multi-color component using the spray polyurethane IMC process involves using a two-piece mold. Such a system and method are described in copending U.S. Patent Application Publication No. 2005/0133959, entitled "System and Method for Producing Multi-Color Polymeric Components," filed on Dec. 22, 2003, and incorporated herein by reference. Another method involves masking a portion of a mold as the mold is sprayed with a coating having one color. The mask is then removed and a second color is sprayed on the mold. Most masks used in this type of process are paper, and are held in position with tape. These masks are manually applied, and are disposed of after each cycle. Other masks have been constructed from nylon or epoxy that has been cut or molded to fit the paint mask (style) line. Manual application of these types of masks is a time-consuming and inefficient process. For example, manually applying each mask reduces the repeatability of the masking process. In addition, the manually applied masks must also be manually removed. This requires additional time, and necessitates frequent mold cleaning.

Therefore, a need exists for a system and method of providing a renewable masking surface that eliminates the shortcomings of the processes described above.

SUMMARY OF THE INVENTION

Accordingly, the invention provides a masking system including a first roll support configured to receive a supply roll of masking material, and to facilitate rotation of the supply roll to dispense the masking material. A second roll support is configured to receive a take-up roll, which is configured to receive the masking material from the supply roll. A contact member is configured to contact an inside surface of the masking material and to cooperate with an object to be masked to capture a portion of the masking material therebetween. The contact member is movable to facilitate positioning of a portion of the masking material proximate the object to be masked.

The invention also provides a masking system including a base, which includes first and second roll supports. The first roll support is configured to receive a supply roll of masking material, and to facilitate rotation of the supply roll to dispense the masking material. The second roll support is configured to receive a take-up roll, which is configured to receive the masking material from the supply roll. A contact member is configured to contact an inside surface of the masking material, and to cooperate with an object to be masked to capture a portion of the masking material therebetween. The contact member is movable to facilitate positioning of a portion of the masking material proximate an object to be masked.

The invention further provides a method of masking an object. The method includes dispensing an amount of masking material from a supply roll, and receiving an amount of masking material onto a take-up roll. The supply roll and the take-up roll cooperate such that masking material dispensed from the supply roll can be received onto the take-up roll. A portion of the masking material is disposed proximate the object to be masked, thereby protectively covering the object to be masked.

DETAILED DESCRIPTION OF THE PREFERRED EMBODIMENT(S)

Figure 1:
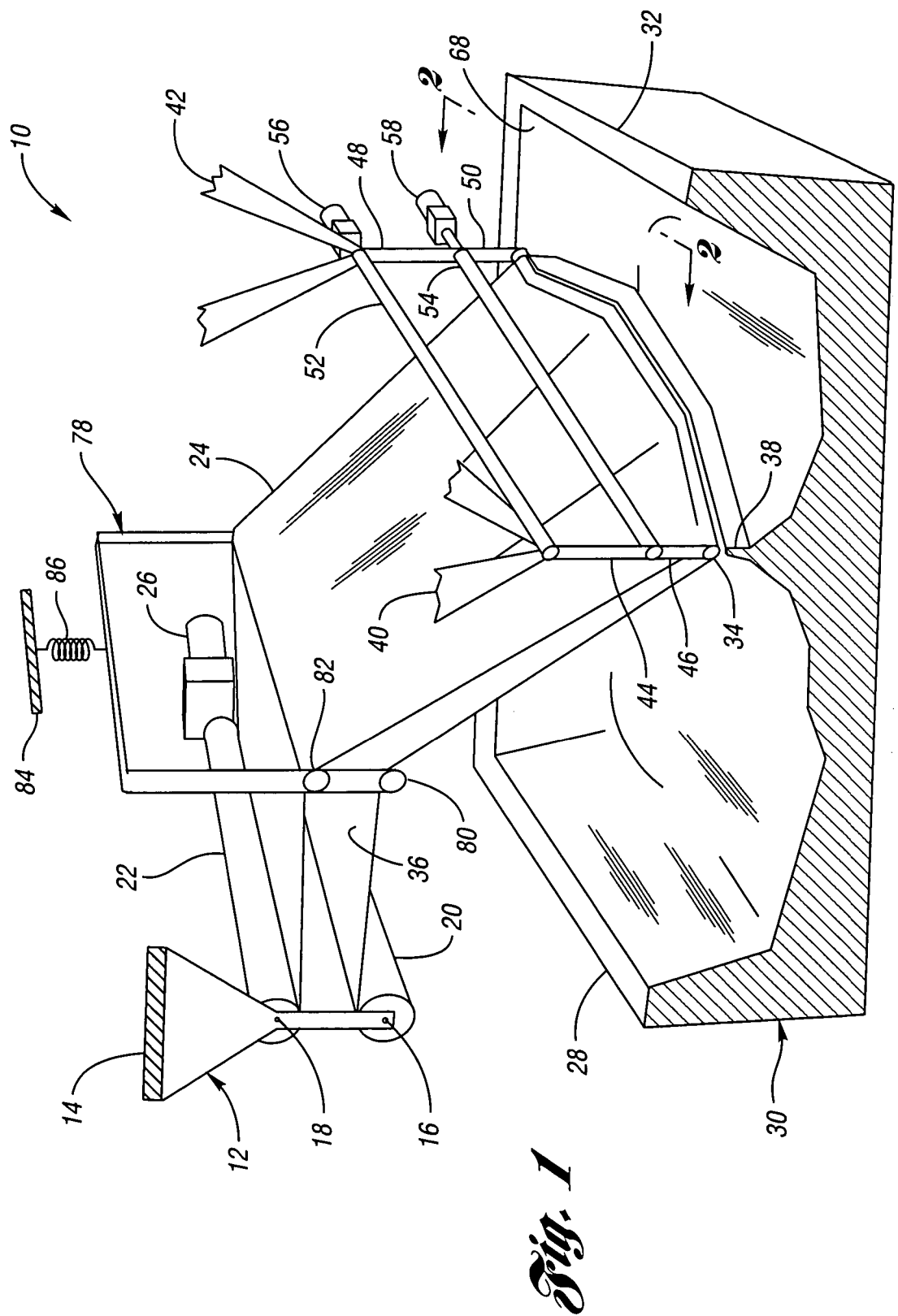
FIG. 1 shows a perspective view of a masking system in accordance with the present invention.

FIG. 1 shows a masking system 10 in accordance with the present invention. The masking system 10 includes a base 12 which is attached to a support structure 14. The support structure 14 is schematically illustrated in FIG. 1, and in practice, can be any structure that is effective to support the base 12. For example, the support structure 14 may be rigidly affixed to a ceiling or floor, or alternatively, may be part of a movable structure, thereby facilitating positioning of the masking system 10.

The base 12 includes first and second roll supports 16, 18, which respectively support a supply roll 20 and a take-up roll 22. The first and second roll supports 16, 18 provide a cantilevered support for the supply roll 20 and the take-up roll 22; however, other types of roll supports may be used. For example, a masking system, such as the masking system 10, may include two pairs of roll supports, one pair each for the supply roll and the take-up roll. In such a configuration, each pair of roll supports may be attached to a single base, or each pair of roll supports may have its own base.

The first roll support 16 is configured to facilitate rotation of the supply roll 20 to dispense masking material 24 contained thereon. The take-up roll 22 is configured to receive the masking material 24 from the supply roll 20. In particular, a motor 26 is operable to rotate the take-up roll 22, thereby dispensing masking material 24 from the supply roll 20. In this way, new masking material 24 is dispensed from the supply roll 20 to replace used masking material 24 which is received onto the take-up roll 22.

A masking system, such as the masking system 10, can be used to cover virtually anything in need of masking. One particularly useful application of the masking system 10 is illustrated in FIG. 1, where it is used to mask a first portion 28 of a mold 30. As explained more fully below, the mold 30 is of a type used in an in-mold coating (IMC) process. The masking system 10 facilitates the production of a two-color component using the mold 30 in an IMC process. This is described more fully below; however, in general, the process involves spraying a second mold portion 32 with a coating having one color, and spraying the first mold portion 28 with a coating having a different color. In order to help ensure that the first mold portion 28 does not receive overspray while the second mold portion 32 is being coated, the masking system 10 includes a contact member, or masking arm 34.

The masking arm 34 is configured to contact an inside surface 36 of the masking material 24. The masking arm 34 cooperates with a raised portion 38 of the mold 30 to capture a portion of the masking material 24 therebetween. The masking arm 34 is movable, which facilitates positioning the masking material 24 to separate the first and second mold portions 28, 32.

In the embodiment shown in FIG. 1, the masking arm 34 is attached to contact member supports 40, 42, only portions of which are shown. The masking arm 34 is pivotally attached to the supports 40, 42 such that it can be easily positioned proximate the mold 30. As with the base 12, the supports 40, 42 may be conveniently attached to any structure that allows them to support the masking arm 34. To facilitate positioning of the masking arm 34, the supports 40, 42 are attached to the masking arm 34 with support links 44, 46, 48, 50. Connecting the support links 44, 46 to the support links 48, 50 are connecting rods 52, 54. Operable to rotate the support links 44, 46, 48, 50 around the connecting rods 52, 54 are motors 56, 58. Using the arrangement shown in FIG. 1, the masking arm 34 can be easily maneuvered into position before a coating is applied to the second mold portion 32, and can be easily moved up and away from the mold 30 when the second coating is applied. Of course, the link and motor system shown in FIG. 1 is just one example of a way in which a contact member, such as the masking arm 34, can be articulated into different positions to facilitate the masking process.

Figure 2:
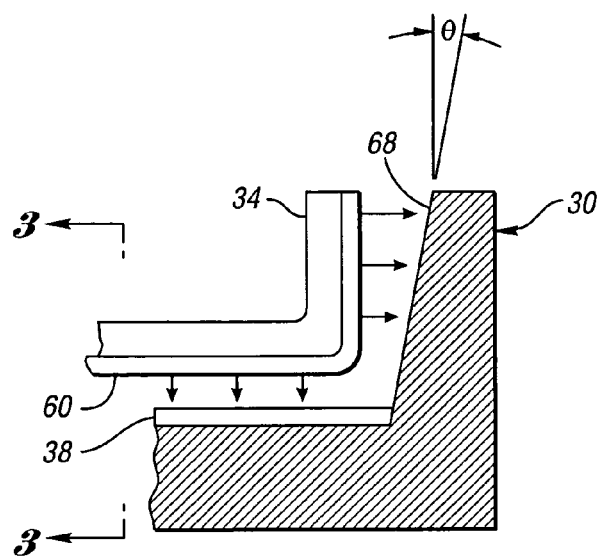
FIG. 2 shows a portion of the masking system taken through line 2—2 in FIG. 1.
Figure 3:
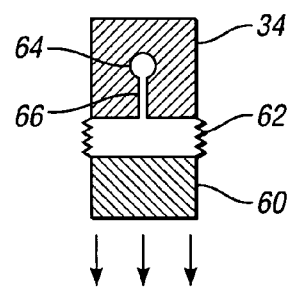
FIG. 3 shows a portion of the masking system taken through line 3—3 in FIG. 2.

In order to provide a good seal between the masking material 24 and the raised portion 38 of the mold 30, the masking arm 34 includes a flexible seal 60, see FIGS. 2 and 3, and is configured to deform when it contacts the mold 30. In addition to helping to provide a good seal between the masking material 24 and the mold 30, the seal 60 also helps to keep the mold 30 from being damaged when the masking arm 34 comes into contact with it. In addition to being generally flexible, the seal 60 is specially configured to be inflatable. FIG. 3 shows a cross section of the masking arm 30 and the seal 60 which illustrates this feature. The seal 60 includes expandable bellows 62 which allow the seal 60 to move in the direction of the arrows. This movement is facilitated by air which is supplied through a central hole 64 in the masking arm 34. The air is then forced out of a series of transverse holes along the length of the masking arm 34, one of which, hole 66, is shown in FIG. 3.

Having an inflatable seal, such as the seal 60, serves a number of purposes. For example, it helps to ensure that the masking arm 34 will not damage the mold 30 when contact is made. Further, an inflatable seal, such as the seal 60, helps to form a seal on portions of the mold that may not strictly conform to the shape of the masking arm 34. For example, FIG. 2 shows a portion of the mold 30, including a side wall 68. The side wall 68 is made with a draft angle (θ) which helps facilitate removal of a finished component from the mold 30. The draft angle (θ) is enlarged in FIG. 2, and may be 5° or less on an actual mold. As shown in FIG. 2, the seal 60 moves toward the mold 30 as it inflates, thereby bridging any gap that may remain when the masking arm 34 is positioned for masking.

Figure 4:
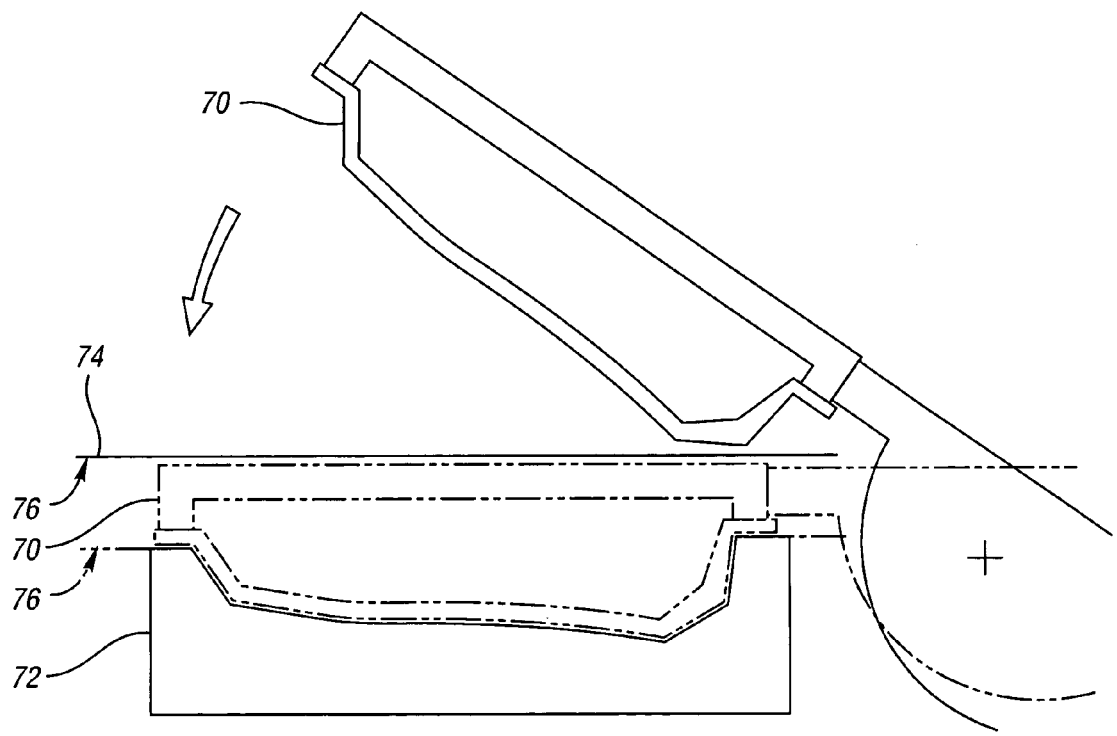
FIG. 4 shows an alternative embodiment of a contact member in accordance with the present invention.

FIG. 4 shows an alternative embodiment of a contact member, or masking arm 70 which is configured to form a nesting relationship with a mold 72. As with the masking arm 34, shown in FIG. 1, the masking arm 70 is configured to contact an inside surface 74 of masking material 76. As indicated by the directional arrow in FIG. 4, the masking arm 70 rotates to cooperate with the mold 72 to capture the masking material 76 therebetween. As shown in phantom in FIG. 4, the rotated masking arm 70 conforms to an inside portion of the mold 72, thereby protecting that portion of the mold during a coating process.

Returning to FIG. 1, it is shown that the masking system 10 includes a tensioning member 78. In the embodiment shown in FIG. 1, the tensioning member 78 includes two rollers 80, 82. The rollers 80, 82 each contact a surface of the masking material 24 and apply a force thereto, which places at least a portion of the masking material 24 in tension. This helps to keep the masking material 24 taut as it is dispensed from the supply role 20 and received by the take-up roll 22. The masking material 24 may be any suitable material, such as, for example, a polyethylene. Alternatively, a non-polyethylene material may be used, particularly one that exhibits greater flexibility than polyethylene.

The masking system 10 includes a tensioning member support 84, which can be any structure that is effective to support the tensioning member 78. The tensioning member 78 is attached to the tensioning member support 84 with a tension spring 86. Of course, this represents just one possible configuration for a tensioning member, such as the tensioning member 78. For example, more than one tension spring may be used to support such a tensioning member. Alternatively, the tensioning member may contact only one surface of the masking material, and it may do so by pushing into, rather than pulling on, the masking material. In such a configuration, compression springs may be used to maintain a force against the masking material, thereby keeping the masking material in tension.

Figure 5:
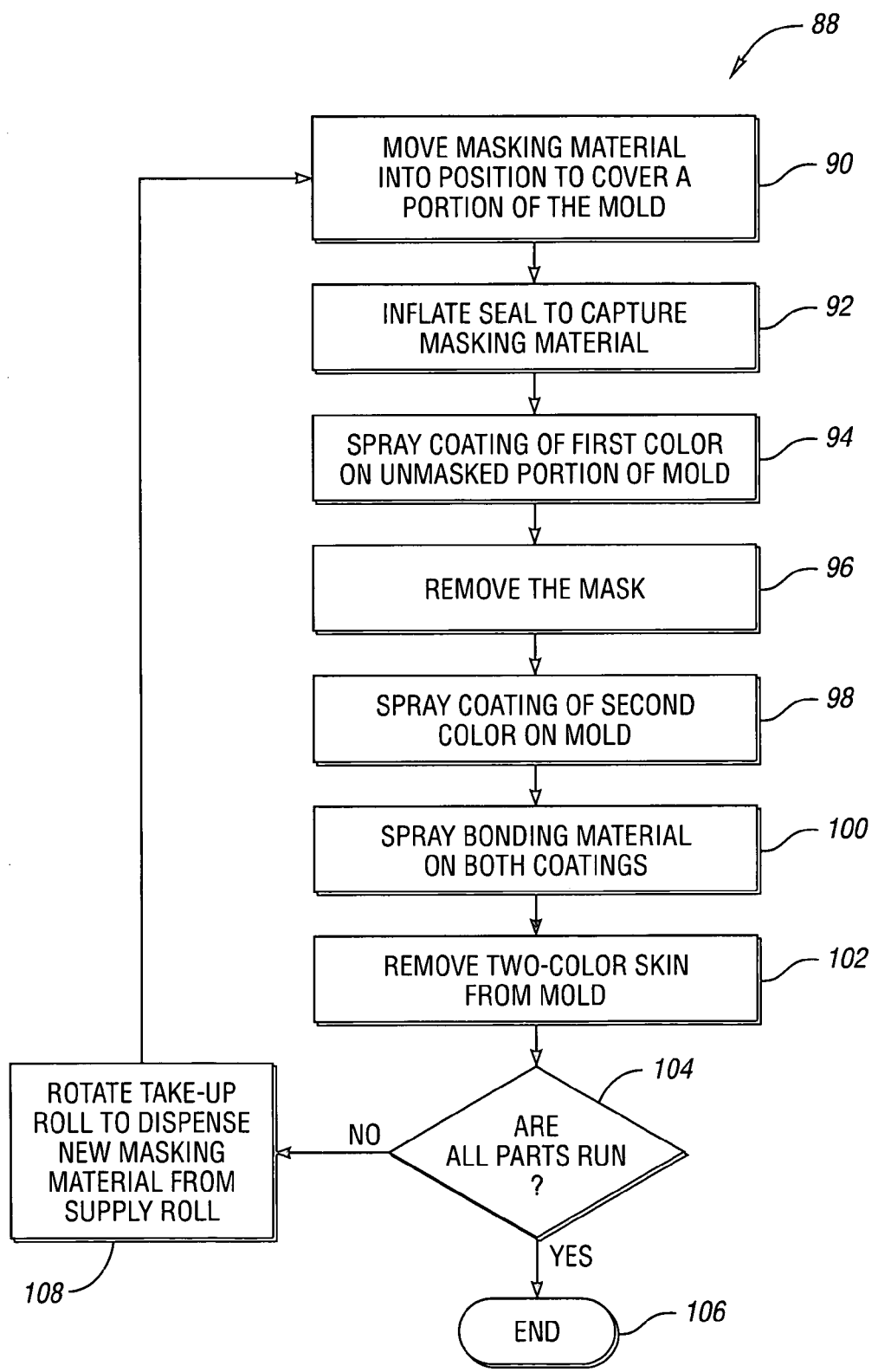
FIG. 5 shows a flowchart illustrating a method in accordance with the present invention.

Although a masking system, such as the masking system 10, may be used for any suitable purpose, one particular purpose to which it is well suited is in the production of a two-color component in an IMC process. FIG. 5 shows a flow chart 88 illustrating a method in accordance with the present invention. Using FIGS. 1–3 as a reference for the masking system 10 and its components, the method begins at step 90 where the masking material 24 is moved into position to cover the first mold portion 28. In particular, the contact arm 34 is moved into position just above the raised portion 38 of the mold 30. At step 92, the seal 60 is inflated to capture the masking material 24 between the masking arm 34 and the mold 30. A coating having a first color is now applied to the second mold portion 32—see step 94.

After the first coating is applied, the masking material 24 is moved away from the mold 30—see step 96. At step 98, a coating having a second color is then sprayed onto the mold 30. Because each of the coatings are opaque, the second coating may be sprayed on the first mold portion 28, without concern for overspray contacting the first coating on the second mold portion 32. At step 100, a bonding material is sprayed over both coatings, thereby integrating the bonding material and the coatings. Although the coatings and the bonding material may be made from any of a number of different materials, polyurethanes which cross-link with each other during the molding process have been found to be particularly effective. Such cross-linked material forms an integrated skin which is then removed from the mold at step 102.

At decision block 104, it is decided whether all of the parts in a production run have been produced. If they have, the process ends at step 106. If, however, more parts need to be run, the take-up roll 22 is rotated by the motor 26 to receive a portion of the masking material 24, and at the same time dispense new masking material 24 from the supply roll 20—see step 108. The process then returns to step 90, where the masking material 24 is again brought into position to cover a portion of the mold.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for producing a multi-color polymeric component using an in-mold coating process, the method comprising:
    applying a contact member having a flexible seal to a surface of a mold such that masking material is captured between the flexible seal and the surface of the mold, and such that the flexible seal conforms to the shape of the surface of the mold to form a seal between the masking material and the surface of the mold, the masking material covering a first portion of the mold;
    spraying a polymeric coating having a first color on a second portion of the mold;
    moving the contact member and the coated masking material away from the mold, thereby uncovering the first portion of the mold;
    spraying a polymeric coating having a second color on at least the first portion of the mold;
    applying a polymeric bonding material to at least a portion of each coating, thereby integrating the coatings and the bonding material; and
    retracting an amount of coated masking material, thereby dispensing an amount of uncoated masking material and facilitating production of another multi-color component.

2. The method of claim 1, further comprising tensioning at least a portion of the masking material.

3. The method of claim 1, wherein the flexible seal is inflatable, and forming a seal between the masking material and the surface of the mold includes inflating the flexible seal.

4. The method of claim 1, wherein retracting an amount of coated masking material includes rotating a take-up roll to receive the coated masking material.

5. The method of claim 4, wherein rotation of the take-up roll is motorized.

6. A method of masking a mold to facilitate a multi-color spray molding process, the method comprising:
    dispensing an amount of masking material from a supply roll;
    receiving an amount of masking material onto a take-up roll, the supply roll and the take-up roll cooperating such that masking material dispensed from the supply roll can be received onto the take-up roll; and
    disposing a portion of the masking material proximate the mold, to protectively cover at least a first portion of the mold, including:
    applying a contact member having a flexible seal to a surface of the mold such that masking material is captured between the flexible seal and the surface of the mold, and such that the flexible seal conforms to the shape of the surface of the mold to form a seal between the masking material and the surface of the mold.

7. The method of claim 6, further comprising:
    spraying a polymeric coating having a first color on a second portion of the mold;
    moving the contact member and the coated masking material away from the mold, thereby uncovering the first portion of the mold;
    spraying a polymeric coating having a second color on at least a first portion the mold; and
    applying a polymeric bonding material to at least a portion of each coating, thereby integrating the coatings and the bonding material.

8. The method of claim 6, wherein the flexible seal includes an inflatable seal, and the step of applying the contact member to the surface of the mold includes inflating the inflatable seal such that the inflatable seal closes a gap between the masking material and the surface of the mold.

9. The method of claim 6, further comprising tensioning at least a portion of the masking material between the supply roll and the take-up roll.

10. The method of claim 6, wherein the receiving an amount of masking material onto a take-up roll is effected by a motor operable to rotate the take-up roll.

* * * * *

UNITED STATES PATENT AND TRADEMARK OFFICE
CERTIFICATE OF CORRECTION

PATENT NO. : 7,153,460 B2 Page 1 of 1
APPLICATION NO. : 10/744153
DATED : December 26, 2006
INVENTOR(S) : Nelson E. Williams et al.

It is certified that error appears in the above-identified patent and that said Letters Patent is hereby corrected as shown below:

On the Title Page, item [54] and Column 1,

In the Title:

Delete "System and"

Signed and Sealed this

Twenty-seventh Day of March, 2007

JON W. DUDAS
*Director of the United States Patent and Trademark Office*